United States Patent [19]

Saxon

[11] 4,086,821
[45] May 2, 1978

[54] DRIVE ASSEMBLY FOR THE ROTOR OF A SOLVENT EXTRACTOR

[75] Inventor: Arthur F. Saxon, Pittsburgh, Pa.

[73] Assignee: Dravo Corporation, Pittsburgh, Pa.

[21] Appl. No.: 768,959

[22] Filed: Feb. 16, 1977

[51] Int. Cl.² .......................... F16H 7/00; F16H 7/12
[52] U.S. Cl. .................................. 74/221; 74/242.1 A
[58] Field of Search ............... 74/221, 242.1 A, 606 R

[56] References Cited

U.S. PATENT DOCUMENTS

| 510,694 | 12/1893 | Marsh | 74/242.1 A |
|---|---|---|---|
| 2,793,920 | 5/1957 | Haaff | 74/221 X |
| 3,730,011 | 5/1973 | Cahill et al. | 74/221 |
| 3,892,140 | 7/1975 | Fox et al. | 74/221 X |
| 4,010,883 | 3/1977 | Ritter | 74/221 X |

Primary Examiner—Leonard H. Gerin
Attorney, Agent, or Firm—Marn & Jangarathis

[57] ABSTRACT

There is disclosed a drive assembly for the rotor of a solvent extractor and comprised of drive sprocket, a guide sprocket and a take-up sprocket on which is coursed an endless chain, which assembly is disposed about a portion of the rotor on which a chain angle including drive clips are peripherally mounted such that the chain contacts a segment of the chain angle about the rotor.

6 Claims, 6 Drawing Figures

DRIVE ASSEMBLY FOR THE ROTOR OF A SOLVENT EXTRACTOR

This invention relates to a drive assembly for an apparatus for the treatment of particulate matter, and more particularly to a drive assembly for the rotor of a rotary solvent extractor for the extraction of solubles from solids utilizing a liquid solvent.

In U.S. Pat. No. 2,840,459, there is disclosed a process and apparatus for the continuous extraction of oils and/or soluble materials, such apparatus comprised of an inner rotor assembly having a plurality of cells formed by radially disposed walls and peripherally disposed inner and outer walls, such rotor assembly rotating about a substantially vertical axis with a vapor-tight vessel. The bottom of each cell is provided with a hinged-door assembly including associated equipment for the opening and closing thereof. Drainage compartments generally underlie the cells for collecting miscella, i.e., a solution of solute and solvent The rotating motion of the inner rotor assembly is provided by a drive assembly including an endless roller chain wrapped completely around the extreme ends of the cells and threaded around a guide sprocket, a drive sprocket, and a tightener sprocket. The sprockets are mounted in a drive box disposed on the outside of the stationary vessel. The chain rest on a circular drive angle mounted about the extreme ends of the cells and which drive angle is provided with clip angles spaced at suitable intervals to match drive clips disposed on the drive chain to provide rotary positive motion to the rotor.

While such a drive assembly has been reliable, such assembly has had its limitations. With a rotary extractor of large diameters, a great length of chain is required, e.g. a 37 foot diameter rotor would require a chain length of about 110 feet. Chain breakage usually resulted in the chain falling into the base of the vapor tight vessel. Removal and replacement of a broken chain is time consuming and extremely difficult. When effecting extraction with a volatile solvent, chain replacement required purging of the atmosphere within the extractor.

OBJECTS OF THE INVENTION

It is an object of the present invention to provide a novel drive assembly for a vertically-disposed rotor assembly.

Another object of the present invention is to provide a novel drive assembly for a vertically-disposed rotor assembly whereby chain length is substantially reduced.

Still another object of the present invention is to provide a novel drive assembly for a rotor assembly disposed on a vertical axis whereby the problems associated with chain breakage is substantially eliminated.

A further object of the present invention is to provide a novel drive assembly for a rotor assembly disposed on a vertical axis thereby permitting facile service and maintenance of such drive assembly.

A still further object of the present invention is to provide a novel drive assembly for a rotor assembly disposed on a vertical axis whereby chain action is substantially improved.

Still another object of the present invention is to provide a novel drive assembly for a rotor assembly disposed on a vertical axis which drive assembly can be installed on existing rotary extractors.

SUMMARY OF THE INVENTION

These and other objects of the present invention are achieved by a drive assembly for the rotor of a solvent extractor and comprised of drive sprocket, a guide sprocket and a take-up sprocket on which is coursed an endless rotor chain, which assembly is disposed about a portion of the rotor such that the rotor chain contacts a segment of the drive clips peripherally mounted on the rotor of the rotary extractor.

BRIEF DESCRIPTION OF THE DRAWINGS

Further objects and advantages of the present invention will become apparent upon consideration of the detailed disclosure thereof, especially when taken with the accompanying drawings wherein like numerals designate like parts throughout and wherein.

Figure 1:
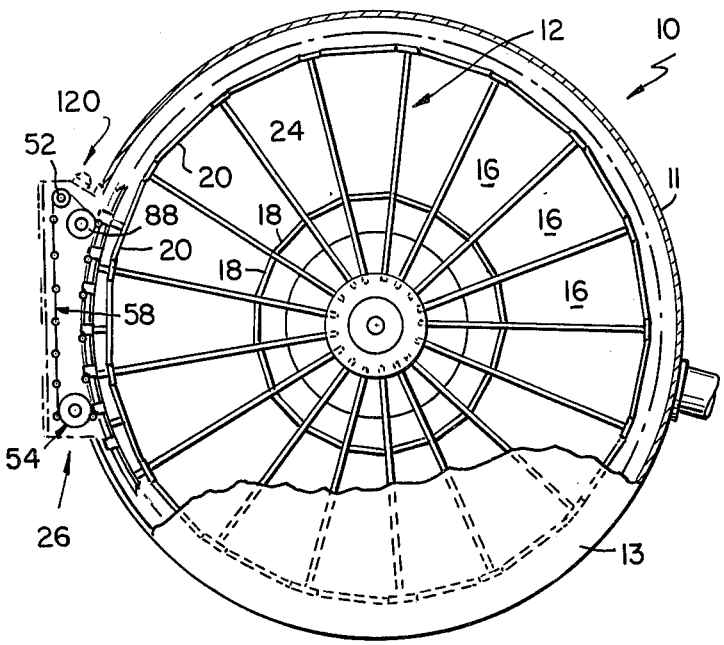
FIG. 1 is a schematic top plan view (partially broken away) of a rotary extractor assembly.
Figure 2:
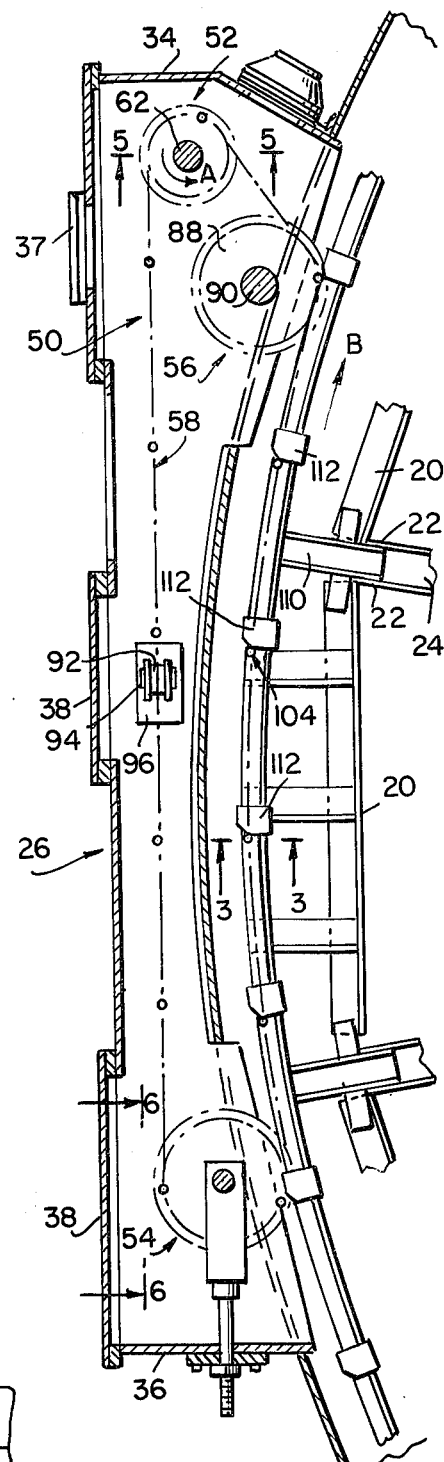
FIG. 2 is an enlarged plan detailed view of the drive assembly of the present invention.

Referring to the drawings and particularly to FIGS. 1 and 2, there is provided an extractor, generally indicated as 10, comprised of a cylindrical casing 11 in which there is mounted for horizontal movement a rotor in the form of a spool frame, generally indicated as 12. A top 13 and bottom (not shown) are affixed to the casing 11 to complete the outer envelope of the extractor 10, such as illustrated in my copending application Ser. No. 717,635 filed Aug. 25, 1976, assigned to the same assignee as the present invention. The spool frame or rotor 12 is formed of a plurality of cells 16 adapted to contain solid material to be extracted. Each cell 16 is open at the top and substantially sector-like in plan and is comprised of vertically disposed inner and outer walls 18 and 20 and radially and vertically disposed paired side walls 22. The paired walls 22 are substantially vertical and incline inwardly towards the center of the respective cells to minimize the tendency of fines to cling thereto. A gabled cap 24 is fixedly positioned on the top of each of the upper edges of the paired walls 22 to assist in the abrupt transfer of liquid from a preceding cell to an immediately succeeding cell and also to prevent any material falling between adjoining walls.

Figure 5:
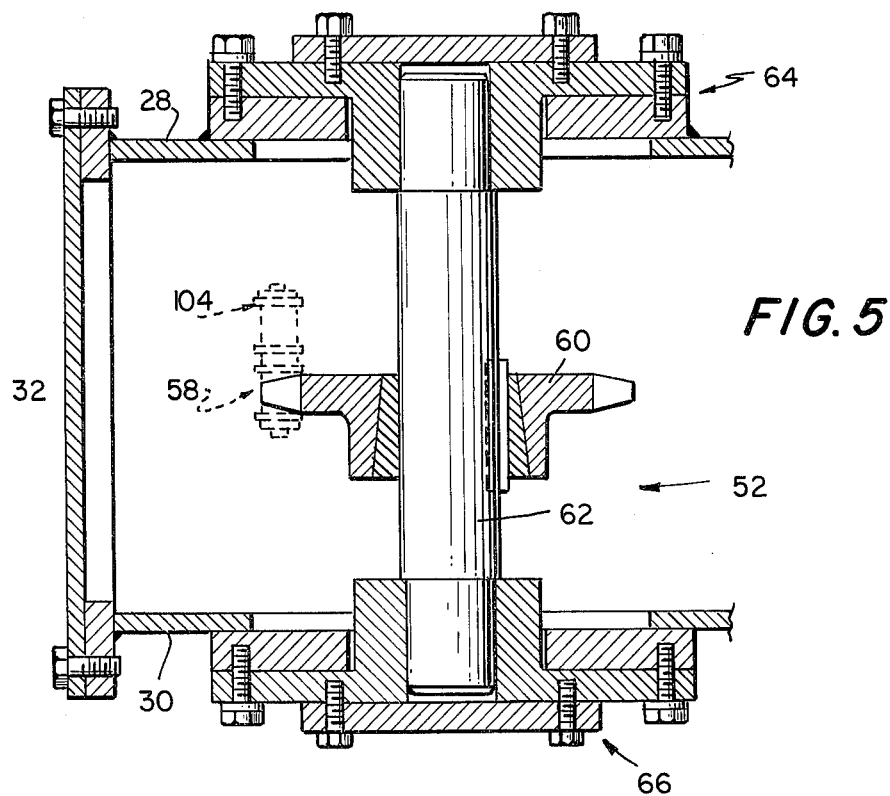
FIG. 5 is a sectional view of the drive sprocket taken along lines 5—5 of FIG. 2.
Figure 6:
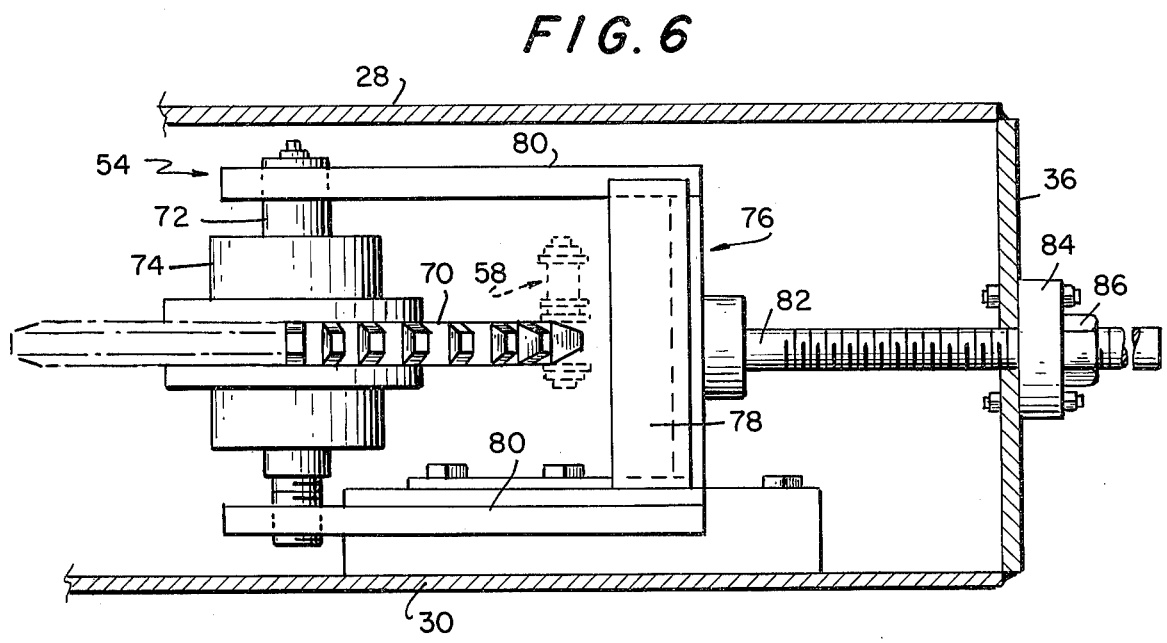
FIG. 6 is an end view (partially in section) of the take-up sprocket taken along the lines 6—6 of FIG. 2.

About a side of the casing 12, there is mounted a drive assembly housing generally indicated as 26, formed of a top, bottom, side and end walls, generally indicated as 28, 30, 32, 34 and 36, respectively, referring particularly to FIGS. 2, 5 and 6. The side wall 32 of the drive assembly housing 26 is provided with a sight glass 37 and accessways 38.

Within the drive assembly housing 26 of the rotary extractor 10, there is mounted a drive assembly, generally indicated as 50, comprised of a drive sprocket assembly, a take-up sprocket assembly and an idler sprocket assembly, generally indicated as 52, 54 and 56 on which is coursed an endless drive chain assembly, generally indicated as 58.

The drive sprocket assembly 52, referring now to FIG. 5, is comprised of a drive sprocket 60 rigidly mounted to a drive shaft journalled in an upper and lower support bearings assemblies, generally indicated as 64 and 66, respectively, mounted to the top and bottom walls 28 and 30, respectively, of the drive assembly housing. The take-up sprocket assembly 54 is comprised of a sprocket 70 journalled for rotation on a shaft 72 by bearings 74. The shaft 72 is fixedly mounted to a U-shaped member, generally indicated as 76, comprised of a base member 78 and horizontally extending arm members 80. To the base member 78 and opposite the arm members 80, there is mounted a threaded rod 82 horizontally extending through side wall 36 on which is mounted a detent 84 of the drive assembly housing 26. Tension of the drive chain assembly 58 is affected by adjusting a take-up bolt 86.

The idler sprocket assembly 56 is comprised of an idler sprocket 88 fixedly mounted to a shaft 108 journalled for rotation in bearing assemblies (not shown) mounted in the upper and lower walls 28 and 30 similar to the upper and lower bearing assemblies 64 and 66 of the drive sprocket assembly 52. A support roller 92 is journalled for rotation on a shaft 94 mounted to a support roller support assembly, generally indicated as 96, mounted on the bottom wall 30 of the drive assembly housing 26 to support the drive chain assembly 58 between the drive sprocket and take-up sprocket assemblies 52 and 54, respectively.

Figure 4:
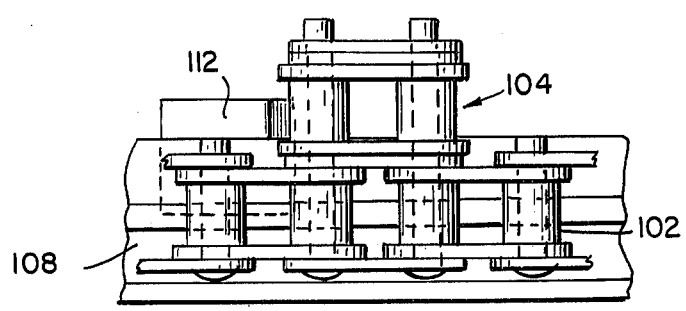
FIG. 4 is a partial detailed side view taken along the lines 4—4 of FIG. 3.

The drive chain assembly 58, referring to FIG. 4, is comprised of a plurality of slip fit chain connecting links 102 on which there is spacially mounted drive clips, generally indicated as 104, such as known and used by those skilled in the art.

Figure 3:
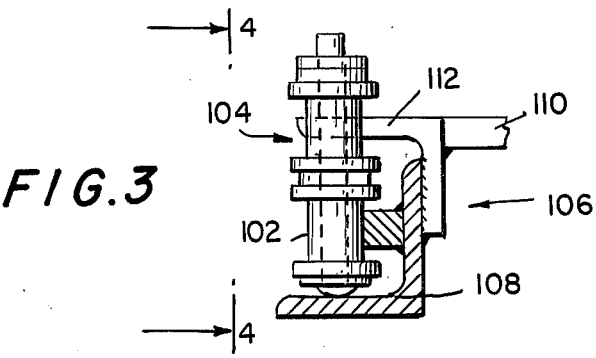
FIG. 3 is a sectional view of the chain and a clip taken along lines 3—3 of FIG. 2.

As hereinabove discussed, on the rotor assembly 12, referring to FIGS. 2, 3 and 4, there is mounted a chain driven assembly, generally indicated as 106, comprised of chain angle 108 peripherally mounted about the rotor assembly 12, such as by welding, to a plurality of horizontally extending arm members 110 mounted to a support assembly for the outer walls 20 of the cells 16. To the chain angle 108 there are spacially mounted, such as by welding, clip angles 112. The drive chain assembly 58 is coursed about the chain driven assembly 106, with a portion tangentially disposed on a segment of the chain angle 108 with the respective drive clips 104 in contacting relationship with the clip angles 112.

In operation, a drive motor assembly, generally indicated as 120 (See FIG. 1), in geared relationship to the shaft 62 of the sprocket drive assembly 52 is caused to rotate the drive sprocket 60 counterclockwise, as illustrated in FIG. 2 by the arrow A, to thereby cause the drive chain assembly 58 to course the sprocket assemblies in a counterclockwise direction as viewed with respect to FIG. 2. The drive clips 104 of the chain drive 58 are caused to tangentially engage the clip angles 112 about that segment of the chain angle 108 between the take-up sprocket assembly 54 and the idler sprocket assembly 56 thereby imparting a clockwise motion to the rotor assembly 12 of the rotary extractor 10, as illustrated by arrow B, about a vertical axis thereof.

While there has been described the use of one drive assembly for the rotor assembly 12 of the rotary extractor 10, it will be understood that more that one drive assembly may be used at different locations to provide the total power requirements.

While the invention has been described in connection with several exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. An improved drive assembly for a solvent extractor including a rotor formed of a plurality of cells arranged in a circumferential fashion on a generally horizontal plane around a vertical axis of rotation, a chain driven assembly circumferentially mounted about said cells of said rotor, an endless chain in contacting relationship to said driven assembly and a chain driving assembly including a drive sprocket for driving said endless chain, the improvement which comprises;

first sprocket and second sprocket assemblies including a first sprocket and a second sprocket, respectively, said first sprocket and said second sprocket being mounted about a plane substantially parallel to said chain drive assembly, said first and second sprockets being spaced from one another a distance substantially equal to a contact length between said endless chain and said chain driven assembly between said first and second sprockets, said endless chain segmentally engaging said chain drive assembly, said endless chain being coursed about said first and second sprockets and said drive sprocket, and said drive assembly being positioned within a drive assembly housing mounted to a casing surrounding said rotor.

2. The improved drive assembly as defined in claim 1 further including a third sprocket and fourth sprocket assemblies including a third sprocket and a fourth sprocket, respectively, and a second endless chain, said third and fourth sprockets being mounted about a plane substantially parallel to second chain driven assembly, said third sprocket and said fourth sprocket being spaced from one another a distance substantially equal to a contact length between said second endless chain and said chain drive assembly between said third and fourth sprockets, said second endless chain segmentally engaging said chain driven assembly, and said second endless chain being coursed about said third and fourth sprockets and a drive sprocket of said second chain driven assembly.

3. The improved drive assembly as defined in claim 1 wherein said drive assembly is formed of a top, bottom, side and end walls.

4. The improved drive assembly as defined in claim 3 wherein said drive sprocket is mounted on a shaft journalled for rotation in bearing assemblies mounted in said top and bottom wall.

5. The improved drive assembly as defined in claim 3 wherein one of said sprocket assemblies is mounted on a shaft journalled for rotation in a U-shaped member fixedly positioned on an end wall thereby to adjust tension of said chain drive.

6. The improved drive assembly as defined in claim 3 wherein said chain drive is caused to be supported by a roller assembly disposed between said drive sprocket and one of said sprocket assemblies.

* * * * *